(12) United States Patent
Hagiwara

(10) Patent No.: US 6,515,982 B1
(45) Date of Patent: Feb. 4, 2003

(54) DEVICE AND METHOD FOR TIME-DIVISION MULTIPLE ACCESS RADIO COMMUNICATION

(75) Inventor: Yasunori Hagiwara, Tokyo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/443,234

(22) Filed: Nov. 18, 1999

(30) Foreign Application Priority Data

Nov. 20, 1998 (JP) ............................................ 10-330478

(51) Int. Cl.[7] .............................................. H04B 7/212
(52) U.S. Cl. ........................ 370/347; 370/348; 370/337; 370/349
(58) Field of Search ................................ 370/347, 348, 370/337, 314, 349, 350, 346

(56) References Cited

U.S. PATENT DOCUMENTS

| | | | | |
|---|---|---|---|---|
| 5,299,198 A | * | 3/1994 | Kay et al. ................... | 370/95.3 |
| 5,872,777 A | * | 2/1999 | Brailean et al. ............. | 370/349 |
| 5,923,662 A | * | 7/1999 | Stirling et al. .............. | 370/432 |
| 6,011,784 A | * | 1/2000 | Brown et al. ............... | 370/329 |
| 6,044,069 A | * | 3/2000 | Wan ........................... | 370/311 |

FOREIGN PATENT DOCUMENTS

| | | |
|---|---|---|
| JP | 3-231534 | 10/1990 |
| JP | 4-54047 | 2/1992 |
| JP | 5-136827 | 6/1993 |

OTHER PUBLICATIONS

Copy of the Japanese Office Action.

* cited by examiner

Primary Examiner—Edward F. Urban
Assistant Examiner—Marlean Milord
(74) Attorney, Agent, or Firm—Merchant & Gould P.C.

(57) ABSTRACT

The present invention reduces power consumption and costs for components, and improves acknowledgement speed by using a memory or the like used only for acknowledgement. A time-division multiple access radio communication device of the present invention includes a receive-data buffer portion for storing received data; a unique word detecting portion for detecting a unique word from the received data; a timer portion for counting time from the point at which the unique word is detected at the unique word detecting portion; a cyclic redundancy check (CRC) calculating portion for checking errors in the received data; and a send-data buffer portion for storing data to be sent. The time-division multiple access radio communication device is further provided with an acknowledgement data generating portion. The acknowledgement data generating portion checks errors in the received data based on the calculation effects at the CRC calculating portion in accordance with the timing counted at the timer portion, and when the received data are assumed to be error-free, the acknowledgement data generating portion automatically generates acknowledgement data, and stores the data in a storage region distinguished from the send-data buffer portion.

3 Claims, 4 Drawing Sheets

DEVICE AND METHOD FOR TIME-DIVISION MULTIPLE ACCESS RADIO COMMUNICATION

BACKGROUND OF THE INVENTION

1. Field of the Invention

The present invention relates to a time-division multiple access (TDMA) radio communication device that automatically can generate acknowledgement data and send the data for response. The present invention relates also to a time-division multiple access radio communication system using the device.

2. Description of the Prior Art

In recent years, various portable communication devices using time-division multiple access radio communication system have been developed. For the portability and durability, the devices are required to be smaller and to minimize power consumption.

An acknowledgement method for a conventional time-division multiple access radio communication system includes the following steps of:

storing received data in a receive-data buffer, based on a synchronization information at a unique word detecting portion;

carrying out CRC calculation by processing with software using a microprocessor; and writing the results in a send-data buffer for sending.

An acknowledgement method in such a conventional time-division multiple access radio communication system is described below by referring to FIG. 4. In FIG. 4, numeral 401 denotes an antenna for receiving data, and 402 denotes a unique word detecting portion. Numeral 403 denotes a receive-data buffer portion, 404 denotes a microprocessor portion, and 405 denotes a send-data buffer portion. Numeral 406 denotes an antenna for sending data, 411 denotes a receive-data processing path, 412 denotes a unique word detection signal, and 413 denotes a send-data processing path.

In FIG. 4, received data inputted from the antenna 401 is passed over the receive-data processing path 411 into the unique word detecting portion 402 and also the receive-data buffer portion 403. When the unique word detecting portion 402 detects a unique word in the received data, it gives out the unique word detection signal 412 and notifies the microprocessor portion 404.

In the microprocessor portion 404, the unique word detection signal 412 is inputted and waits for a certain period until the received data are completely stored in the receive-data buffer portion 403, so that the timing to start the cyclic redundancy check (CRC) calculation is adjusted. A remainder term as a result of division for checking transmission errors is added to the received data.

When the received data are completely stored in the receive-data buffer portion 403, CRC calculation is carried out for obtaining the remainder term by the above-mentioned division based on the received data. If the remainder term obtained by the CRC calculation coincides with a remainder term (CRC) sent together with the received data, the received data are regarded as error-free, and acknowledgement send data are prepared in the send-data buffer portion 405 for acknowledgement. And the microprocessor portion 404 directs sending in accordance with timing of sending data at the certain station. Consequently, acknowledgement data are sent to the antenna 406 through the send-data processing path 413, and the data are outputted as a radio wave.

However, in some time-division multiple access radio communication systems, acknowledgement should be sent immediately in accordance with the timing of the desired station. In such a case, a CPU is kept busy with the acknowledgement process or the CPU is unduly loaded if acknowledgment is carried out by the conventional software processing. And thus, it prevents other processes from being carried out on the CPU. To solve such a problem, acknowledgement is often processed with a high-speed microprocessor specialized for an acknowledgement process. However, it will cause some problems, e.g., the communication device consumes much power, or the component cost rises.

Such a conventional system uses a send-data buffer designed for normal communication. Therefore, the normal send-data should be moved to and kept in another memory during acknowledgement. This also causes problems, for example, the component cost rises and communication response deteriorates due to replacement of data.

SUMMARY OF THE INVENTION

It is an object of the present invention to solve these problems by using memories or the like exclusive to acknowledgement, so that power consumption is lowered, component cost is reduced and speed of response is improved.

In order to achieve the object, a time-division multiple access radio communication device according to this invention comprises:

a receive-data buffer portion to receive data from plural sources by sing a carrier wave and store the received data;

a unique word detecting portion to detect a unique word from the received data to determine a synchronous point as a starting point for timing adjustment;

a timer portion for the timing adjustment by counting time from the point that the unique word is detected at the unique word detecting portion;

a CRC calculating portion to check errors in the received data; and a send-data buffer portion to store the data to be sent. The time-division multiple access radio communication device is further provided with an acknowledgement data generating portion. This acknowledgement data generating portion checks errors in the received data based on a calculation result at the CRC calculating portion in accordance with the timing counted at the timer portion. When the received data are assumed to be error-free, the acknowledgement data generating portion generates acknowledgement data and stores the data in a storage region distinguished from the send-data buffer portion.

As a result, acknowledgement data can be sent without providing a high-speed microprocessor exclusive to acknowledgement. In addition, since the acknowledgement data are stored in a storage region distinguished from the send-data buffer portion, the acknowledgement data are not replaced by normal send-data at a send-data buffer. Thus, deterioration of the communication response can be prevented.

The time-division multiple access radio communication device preferably includes plural receive-data buffers at a receive-data buffer portion, and includes plural send-data buffers at a send-data buffer portion. If the device includes plural data buffers for receiving and sending data respectively, send-/receive-data are not replaced at the send-/receive-data buffers even when plural data are sent/received simultaneously, and consequently, deterioration of the communication response can be prevented.

A time-division multiple access radio communication method according to the present invention includes the following steps of:

receiving data from plural sources by using a carrier wave and storing the data;

detecting a unique word from the received data in order to determine a synchronous point as a starting point for timing adjustment;

counting time from the point that the unique word is detected;

carrying out CRC calculation for checking errors in the received data; and storing the data to be sent. The method further includes the steps of:

checking errors in the received data based on the CRC calculation result;

generating acknowledgement data when the received data are assumed to be error-free; and storing the acknowledgement data in a storage region distinguished from the send-data buffer portion.

As a result, acknowledgement data can be sent without providing a high-speed microprocessor exclusive to acknowledgment. In addition, since the acknowledgement data are stored in a storage region distinguished from the send-data buffer portion, the acknowledgement data are not replaced by normal send-data at a send-data buffer. And thus, deterioration of the communication response can be prevented.

DESCRIPTION OF THE PREFERRED EMBODIMENTS

First Embodiment

Figure 1:
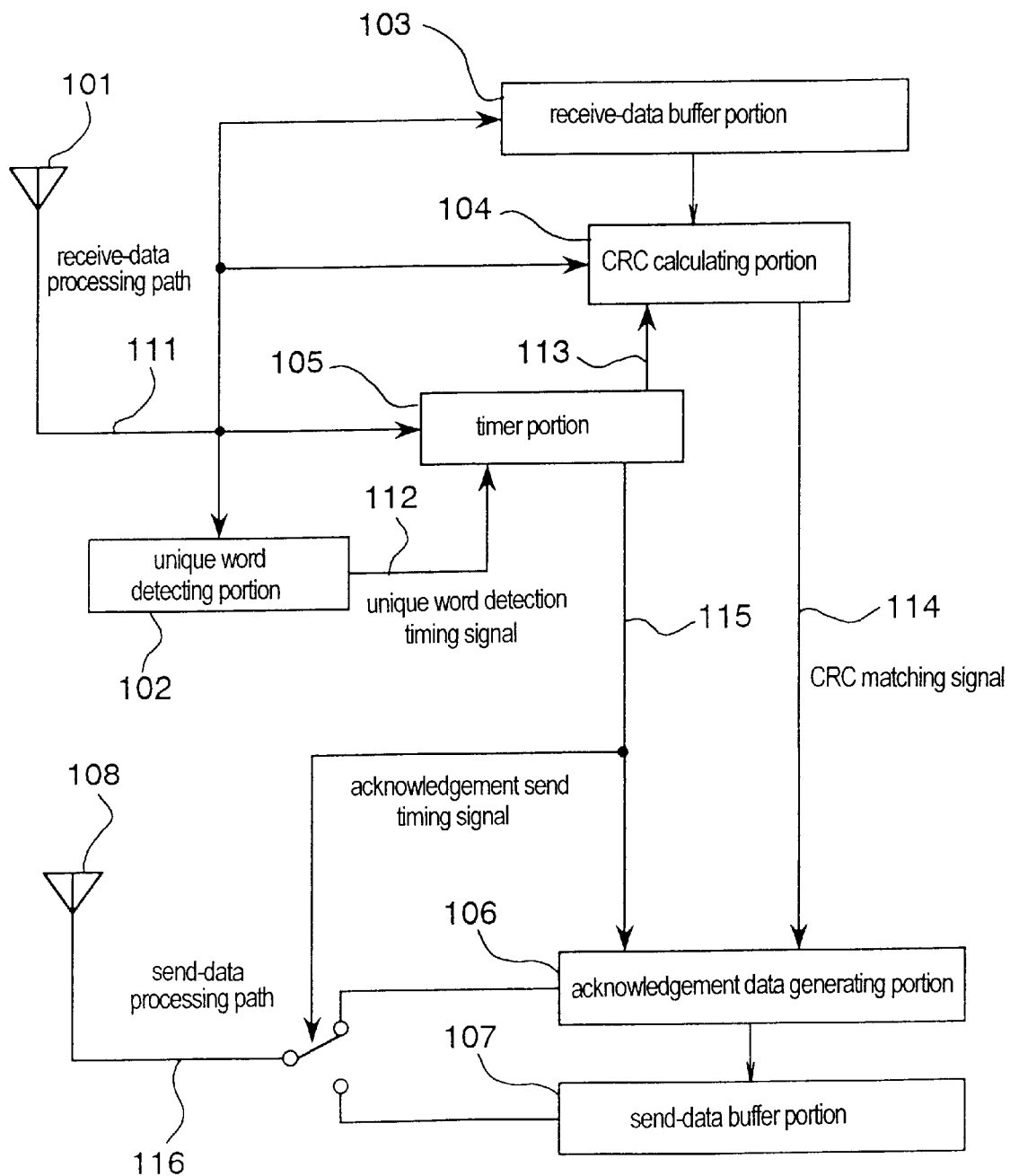
FIG. 1 is a block diagram illustrating a time-division multiple access radio communication device according to a first embodiment of the present invention.

A time-division multiple access radio communication device according to a first embodiment of the present invention is described below with a reference to FIG. 1. FIG. 1 is a block diagram illustrating a time-division multiple access radio communication device according to this embodiment. In FIG. 1, numeral 101 denotes an antenna for receiving data, 102 denotes a unique word detecting portion, 103 denotes a receive-data buffer portion, 104 denotes a CRC calculating portion, 105 denotes a timer portion, 106 denotes an acknowledgement data generating portion, 107 denotes a send-data buffer portion, 108 denotes an antenna for sending data, 111 denotes a receive-data processing path, 112 denotes a unique word detection timing signal, 113 denotes a CRC calculation timing signal, 114 denotes a CRC matching signal, 115 denotes an acknowledgement send timing signal, and 116 denotes a send-data processing path. The unique word detecting portion 102 can be composed of, for example, a serial register storing a unique word and a comparator. For the antennas 101 and 108, an integrated antenna with a switch for send/receive can be used. However, there is no particular limitation to their configurations, and other configurations are possible as long as they provide equivalent functions.

A signal received at the antenna 101 is passed over the receive-data processing path 111 into the unique word detecting portion 102, the receive-data buffer portion 103, the CRC calculating portion 104 and the timer portion 105 respectively.

When the unique word detecting portion 102 detects a unique word from the received data, it gives out a unique word detection timing signal 112, and notifies the timer portion 105 of the signal as a synchronous point. The timer portion 105 generates an accurate clock based on the received synchronous point in order to notify of a CRC calculation timing, send-data path switching timing, and acknowledgement send timing. All basic timings are counted at a clock synchronized with the received unique word detection timing signal 112.

In a measurement of the CRC calculation timing, the timer portion 105 outputs the CRC calculation timing signal 113 in the CRC calculating portion 104 when data subjected to CRC calculation are completely received, according to a clock based on a point of time that the unique word detection timing signal 112 is inputted.

In a switching of the send-data path and measurement of the acknowledgement send timing, the acknowledgement send timing signal 115 is outputted at the time when the acknowledgement data are completely generated, according to a clock based on a point of time that the unique word detection timing signal 112 is inputted.

At the CRC calculating portion 104, the received data are subjected to CRC calculation. A remainder term as a result of division for checking transmission errors is provided to the received data. When storage of the received data in the receive-data buffer portion 103 is completed, i.e., at the time when the CRC calculation timing signal 113 is notified, CRC calculation is carried out by conducting a similar division based on the received data for obtaining a remainder term. If the remainder term as a result of the CRC calculation and a remainder term (CRC) sent with the received data are coincided with each other, the CRC calculating portion 104 regards the received data as being free of burst errors, and outputs CRC matching signal 114 so as to notify the acknowledgement data generating portion 106 that no errors have been found in the received data.

When the CRC matching signal 114 is inputted in the acknowledgement data generating portion 106, data for acknowledgement are generated inside the acknowledgement data processing portion 106. When the acknowledgement send timing signal 115 generated at the timer portion 105 is inputted, the acknowledgement data generated at the acknowledgement data generating portion 106 is outputted to the send-data processing path 116 and sent from the antenna 108. Data switching with normal send-data is carried out by the acknowledgement send timing signal 115 generated at the timer portion 105. The connection from a normal send-data buffer portion 107 in the send-data processing path 116 is switched to the acknowledgement data generating portion 106.

As described above, this embodiment automatically carries out generation of the timing signal from the time of detection of the unique word to acknowledgement, and also generation of acknowledgement data based on the CRC calculation results. Therefore, a calculation process by a high-speeed microprocessor exclusive to acknowledgement is not needed, unlike conventional acknowledgement processes using software. As a result, plural microprocessors are not necessary, and the microprocessor is not required to have high performance. Therefore, the components can be reduced and the power consumption can be lowered.

Moreover, normal send-data can be stored in the send-data buffer portion, as the acknowledgement signal is generated at the acknowledgement data generating portion. And thus, replacement of the acknowledgement data with normal data is not necessary. As a result, periods for data replacement is reduced and response for send/receive can be improved. In addition to that, since memories or the like for replacement are not needed, components for the device can be reduced and power consumption is also lowered.

Second Embodiment

Figure 2:
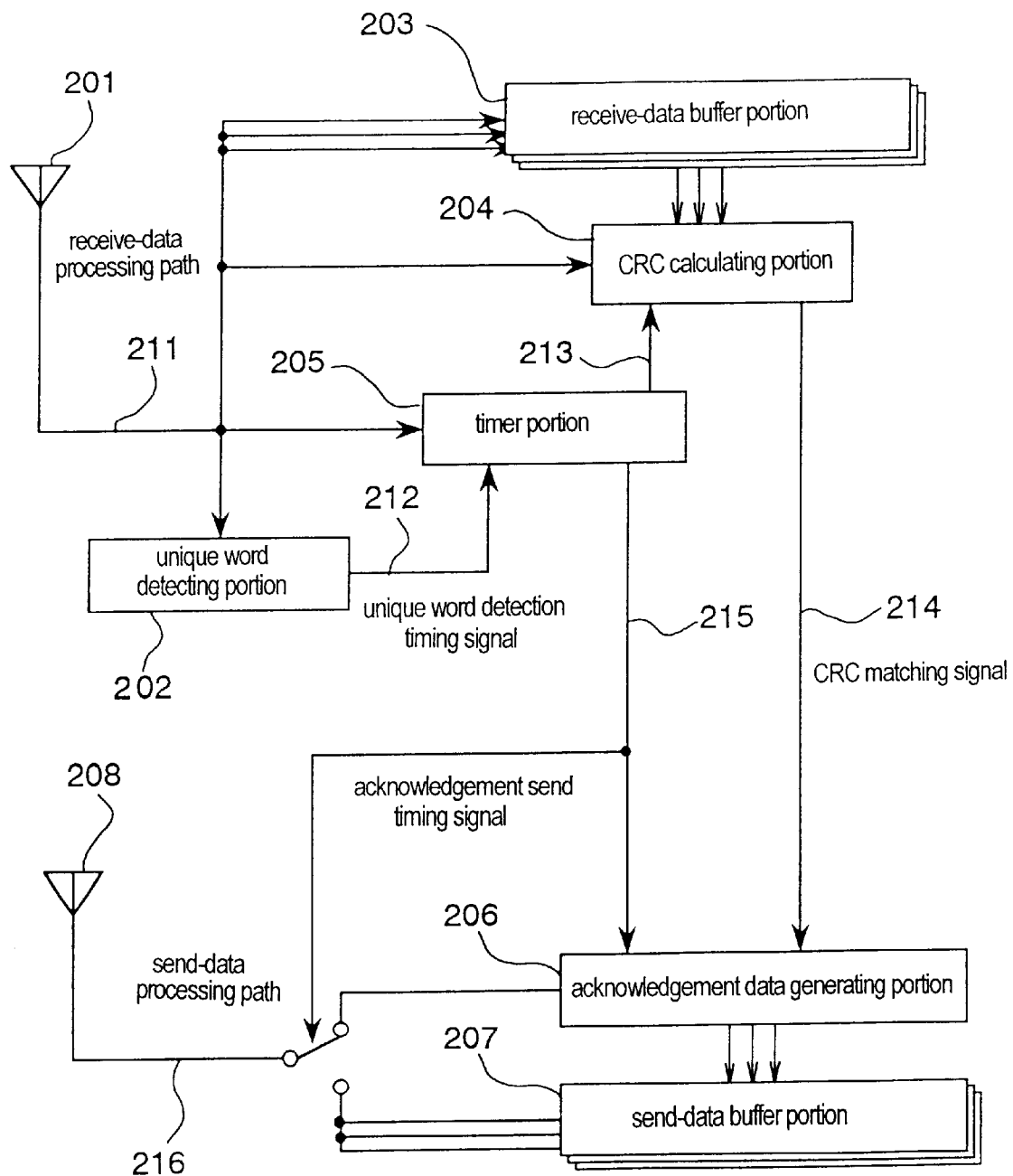
FIG. 2 is a block diagram illustrating a time-division multiple access radio communication device according to a second embodiment of the present invention.

A time-division multiple access radio communication device according to a second embodiment of the present invention is described below with reference to FIG. 2. FIG. 2 is a block diagram illustrating a time-division multiple access radio communication device according to this embodiment. In FIG. 2, numeral 201 denotes an antenna for receiving data, 202 denotes a unique word detecting portion, 203 denotes a receive-data buffer portion composed of plural receive-data buffers for respective time-division multiple access radio communications, 204 denotes a CRC calculating portion, 205 denotes a timer portion, 206 denotes an acknowledgement data generating portion, 207 denotes a send-data buffer portion composed of plural send-data buffers for respective time-division multiple access radio communications, 208 denotes an antenna for sending data, 211 denotes a receive-data processing path, 212 denotes a unique word detection timing signal, 213 denotes a CRC calculation timing signal, 214 denotes a CRC matching signal, 215 denotes an acknowledgement send timing signal, and 216 denotes a send-data processing path. The unique word detecting portion 202 can be composed of, for example, a serial register storing a unique word and a comparator. For the antennas 201 and 208, an integrated antenna with a switch for send/receive can be used. However, there is no particular limitation to their configurations, and other configurations are possible as long as they provide equivalent functions.

A signal received at the antenna 201 is passed over the receive-data processing path 211 into the unique word detecting portion 202, the receive-data buffer portions 203, the CRC calculating portion 204 and the timer portion 205 respectively.

When the unique word detecting portion 202 detects a unique word from the received data, it gives out the unique word detection timing signal 212, and notifies the timer portion 205 of the signal as a synchronous point. The timer portion 205 generates an accurate clock based on the received synchronous point in order to notify a CRC calculation timing, send-data path switching timing, and acknowledgement send timing. All basic timings are counted at a clock synchronized with the received unique word detection timing signal 212.

In a measurement of the CRC calculation timing, the CRC calculation timing signal 213 is outputted at the time when data subjected to CRC calculation are completely received, according to a clock based on a point of time that the unique word detection timing signal 212 is inputted in the CRC calculating portion 204.

In a switching of the send-data path and measurement of the acknowledgement send timing, the acknowledgement send timing signal 215 is outputted at the time when the acknowledgement data are completely generated, according to a clock based on a point of time that the unique word detection timing signal 212 is inputted.

At the CRC calculating portion 204, the received data are subjected to CRC calculation. A remainder term as a result of division for checking transmission errors is provided to the received data. When storage of the received data in the receive-data buffer portions 203 is completed, i.e., at the time when the CRC calculation timing signal 213 is notified, CRC calculation is carried out by conducting a similar division based on the received data for obtaining a remainder term. If the remainder term as a result of the CRC calculation and a remainder term (CRC) sent with the received data are coincided with each other, the CRC calculating portion 204 regards the received data as being free of burst errors, and outputs CRC matching signal 214 so as to notify the acknowledgement data generating portion 206 that no errors have been found in the received data.

When the CRC matching signal 214 is inputted in the acknowledgement data generating portion 206, data for acknowledgement are generated inside the acknowledgement data processing portion 206. When the acknowledgement send timing signal 215 generated at the timer portion 205 is inputted, the acknowledgement data generated at the acknowledgement data generating portion 206 is outputted to the send-data processing path 216 and sent from the antenna 208. Data switching with normal send-data is carried out by the acknowledgement send timing signal 215 generated at the timer portion 205. The connection from a normal send-data buffer portions 207 in the send-data processing path 216 is switched to the acknowledgement data generating portion 206.

In this embodiment, plural receive-data buffer portion 203 and send-data buffer portion 207 are provided with plural buffers respectively for plural time-division multiple access radio communications. Therefore, data concerning respective opponent communicators are stored in the respective receive-data buffers 203 and the respective send-data buffers 207. Even when plural time-division multiple access radio communications are carried out simultaneously, received data are stored in each buffer for each communicator, and the data are not replaced among the buffers. As a result, the communication response can be kept.

In this embodiment, effects equivalent to the first embodiment are expected. In addition, even when plural time-division multiple access radio communications are carried out simultaneously, the received data are stored in the respective buffers and the data are not replaced among the buffers. So the response for send/receive can be kept.

Figure 3:
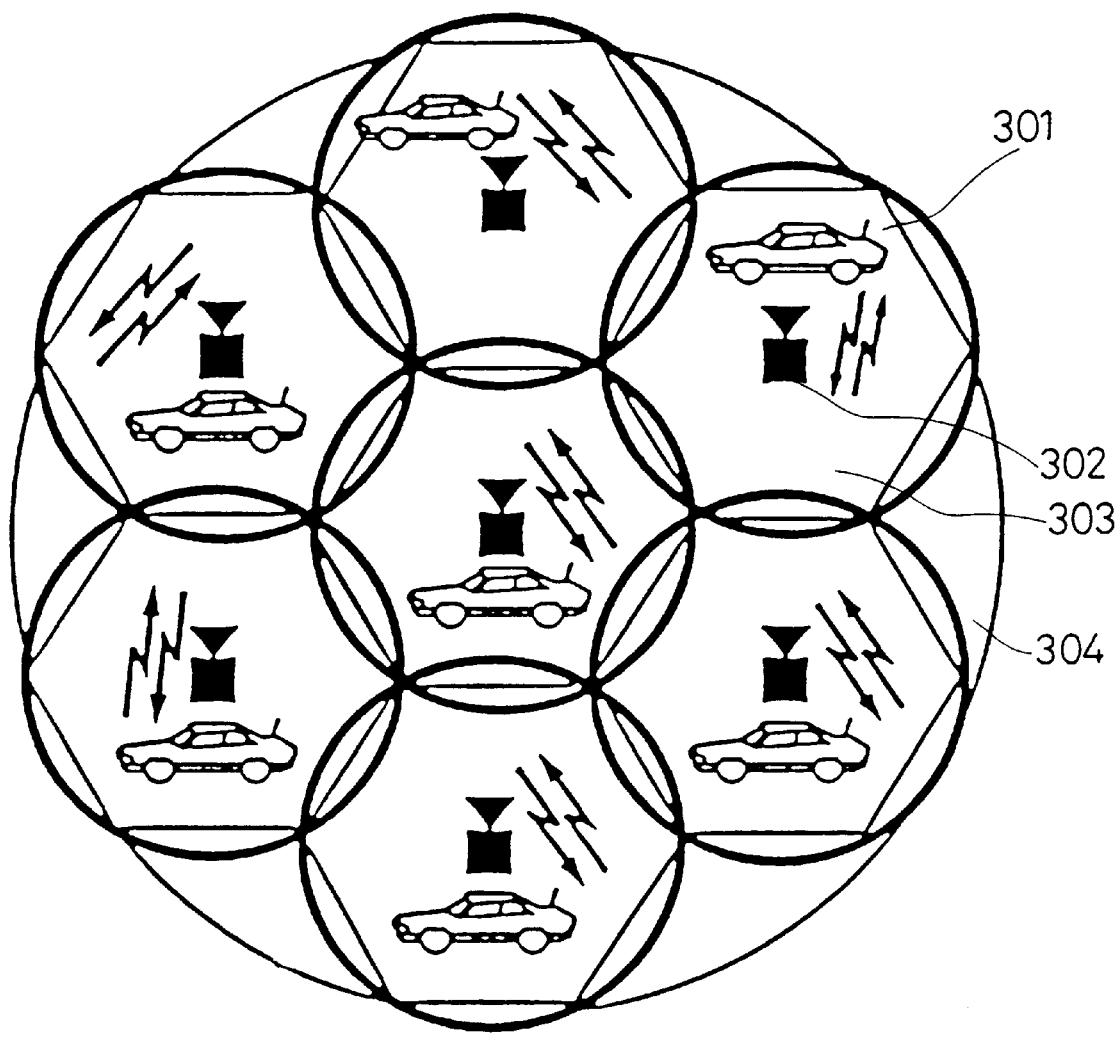
FIG. 3 is a conceptual view illustrating mobile unit communication according to an embodiment of the present invention.
Figure 4:
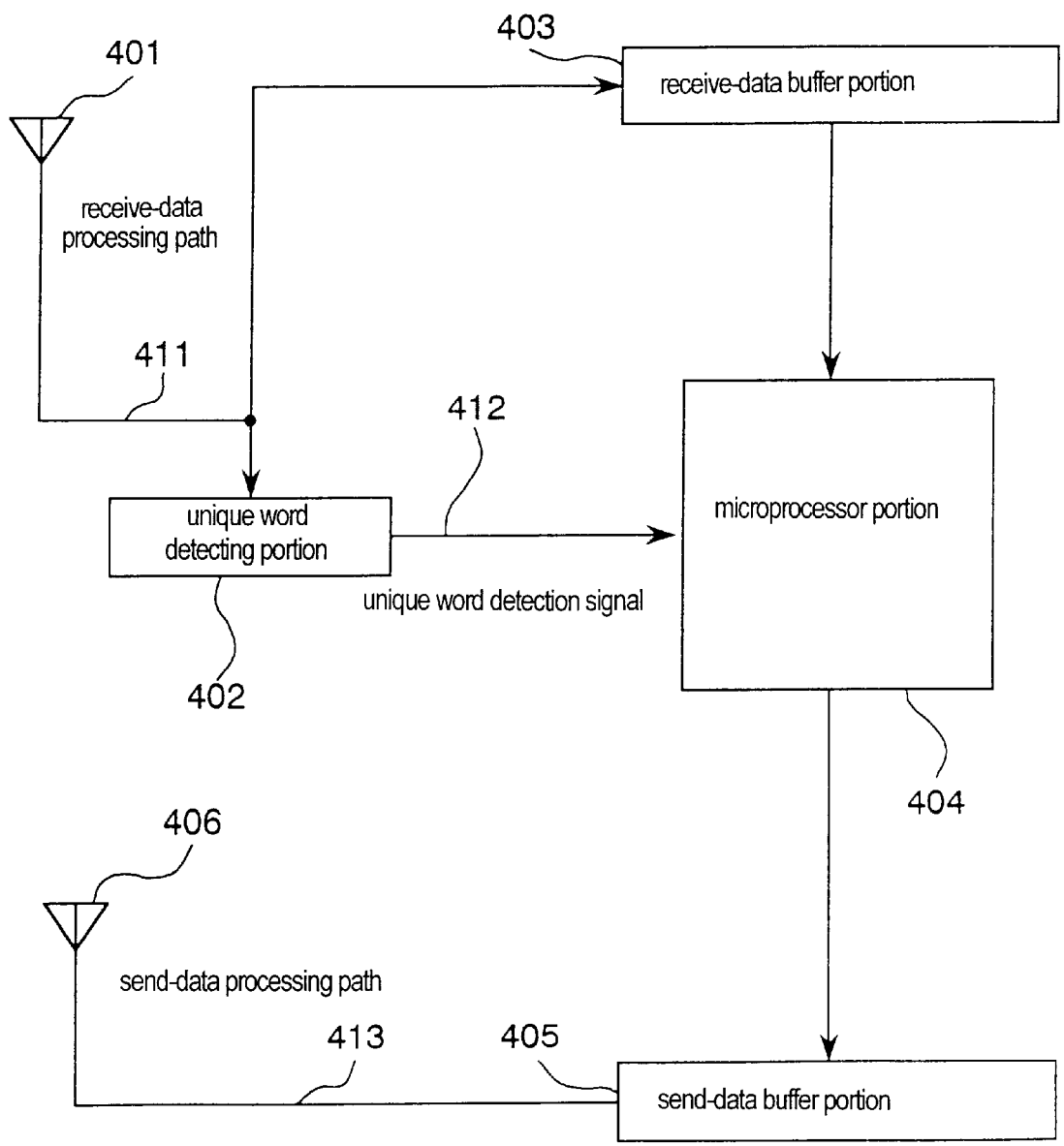
FIG. 4 is a block diagram illustrating a time-division multiple access radio communication device according to the prior art.

A time-division multiple access radio communication device in one embodiment of the present invention is described below. FIG. 3 is a conceptual view illustrating application of a time-division multiple access radio communication device of this embodiment to a mobile unit communication system. In FIG. 3, numeral 301 denotes a mobile unit communication terminal (e.g., an automobile station), 302 denotes a mobile unit communication base station. Numeral 303 denotes an area covered by a base station, and 304 denotes a service area.

In a general mobile unit communication system, the communication is subject to considerable interfering waves, depending on the locations of the mobile unit communication terminal 301 and the mobile unit communication base station 302. In order to reserve stable communication in such a case, the whole service area 304 should be enlarged either by enlarging the area 303 that a mobile unit communication base station 302 covers, or by increasing the number of the mobile unit communication base stations 302.

However, in order to enlarge the area 303 that a base station 302 covers, the transmission output of the mobile unit communication base station 302 and of the mobile unit communication terminal 301 should be increased. This requires a comparatively large-scaled remodel for the mobile unit communication base station 302, and service will be suspended for a certain period. In addition, output of the mobile unit communication terminal 301 cannot be increased easily since the capacity and weight are restricted to keep its portability. Therefore, increase of output is not a proper method.

When a time-division multiple access radio communication device of the present invention is used for the mobile unit communication base station 302, the relay device of a base station can be small and light-weight as the components will be decreased. As a result, the numbers of the mobile unit communication base stations 302 can be increased readily, and the service area 304 can be enlarged.

Similarly, the weight of the mobile unit communication terminal 301 can be reduced by using a time-division multiple access radio communication device of the present invention, since the components will be reduced. Moreover, since such a device consumes less power, the capacity of the battery can be made smaller to reduce the weight of the mobile unit communication terminal 301. Since less power is consumed, the operating time can be extended, and portability of the mobile unit communication terminal 301 is improved.

The above effects will not be limited to this embodiment but similar effects can be expected for small area communication represented by PHS. The present invention is effective also for improvement of the communication response.

According to the time-division multiple access radio communication device of the present invention and the method using the same, generation of the timing signal from detection of the unique word to acknowledgement, and also generation of acknowledgement data based on the CRC calculation results, are carried out automatically. Therefore, a calculation process by a high-speed microprocessor exclusive to acknowledgement is not needed unlike conventional acknowledgement processes using software. As a result, plural microprocessors are not necessary, and the microprocessor is not required to have high quality. Therefore, the components for a device can be reduced and the power consumption can be lowered.

Moreover, normal send-data can be stored in the send-data buffer portion, as the acknowledgement signal is generated at the acknowledgement data generating portion. And thus, replacement of the acknowledgement data with normal data is not necessary. As a result, the time for data replacement is reduced and response of send/receive can be improved. In addition to that, as memories or the like for replacement are not needed, the components for the device can be reduced and power consumption is also lowered.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A time-division multiple access radio communication device comprising:

a receiving-data buffer portion to receive data from plural sources by using a carrier wave and to store the received data;

a unique word detecting portion to detect a unique word from the received data to determine a synchronous point as a starting point for timing adjustment;

a timer portion for the timing adjustment by counting time from the point that the unique word is detected at the unique word detecting portion;

a cyclic redundancy check (CRC) calculating portion to check errors in the received data; and a send-data buffer portion to store the data to be sent;

wherein an acknowledgement data generating portion is further provided, the acknowledgement data generating portion checking errors in the received data based on a calculation result at the CRC calculating portion, and when the data are assumed to be error-free, the acknowledgment data generating portion generating acknowledgement data and sending to a send-data processing path, while at all other times sending stored data from the send-data buffer portion to a send-data path by switching.

2. The time-division multiple access radio communication device according to claim 1, wherein the receive-data buffer portion receives plural receive-data slots and the acknowledgement data slots, the send-data buffer portion sends plural send data slots and the acknowledgement data slots.

3. A time-division multiple access radio communication method comprising the steps of:

receiving data from plural sources by using a carrier wave and storing the data;

detecting a unique word from the received data in order to determine a synchronous point as a starting point for timing adjustment;

counting time from the point that the unique word is detected;

carrying out CRC calculation for checking errors in the received data; and storing the data to be sent, wherein the method further comprising the steps of:

checking errors in the received data based on the CRC calculation result;

generating acknowledgment data when the received data are assumed to be error-free; and sending to a send-data processing path, while at all other times sending stored data from the send-data buffer portion to a send-data path by switching.

* * * * *